Figure 1:
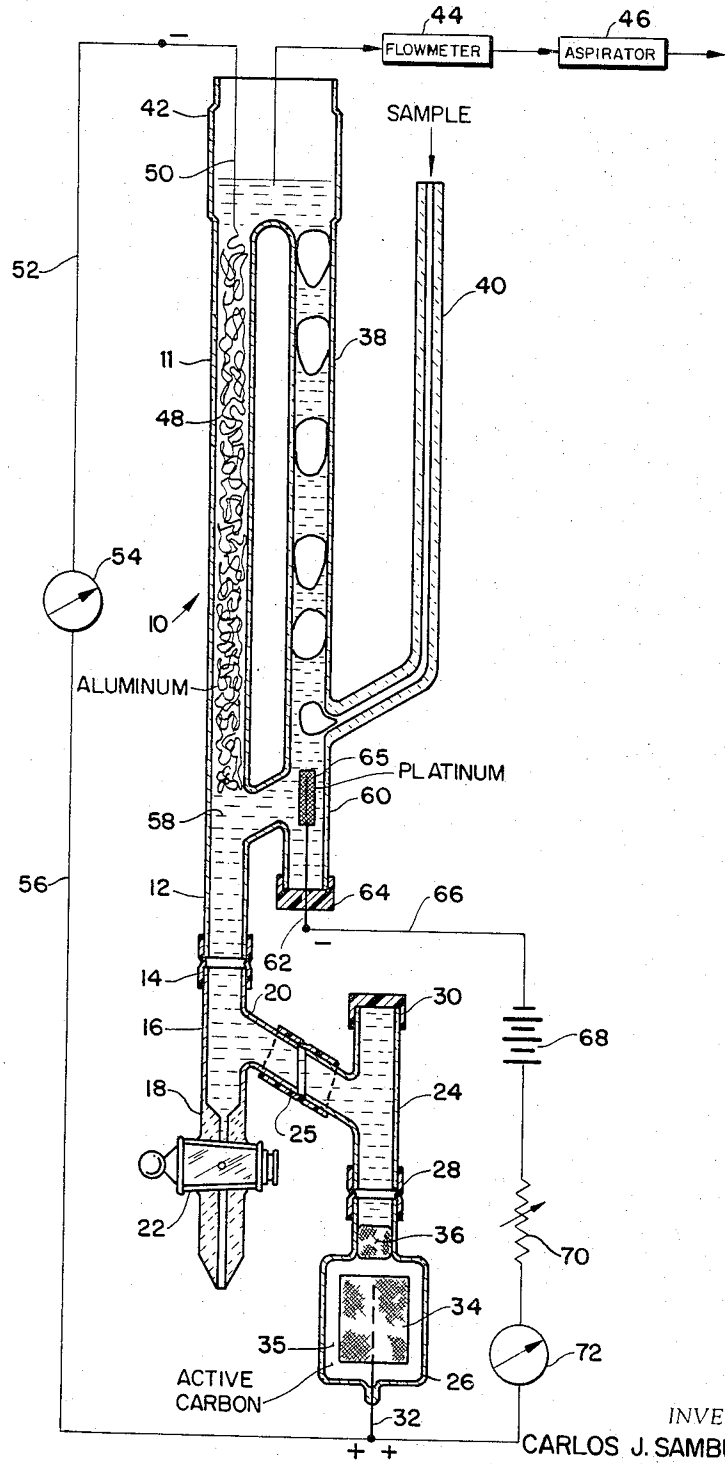

ALKALI ANALYSIS

Filed Feb. 18, 1965

2 Sheets-Sheet 1

INVENTORS
CARLOS J. SAMBUCETTI
RUDOLF DEURINGER
BY Thomas L. Peterson
ATTORNEY

ALKALI ANALYSIS

Filed Feb. 18, 1965

INVENTORS
CARLOS J. SAMBUCETTI
RUDOLF DEURINGER
BY Thomas L. Peterson
ATTORNEY

United States Patent Office 3,377,256

Patented Apr. 9, 1968

1

3,377,256

ALKALI ANALYSIS

Carlos J. Sambucetti, La Habra, and Rudolf Deuringer, El Toro, Calif., assignors to Beckman Instruments, Inc., a corporation of California Filed Feb. 18, 1965, Ser. No. 433,555
17 Claims. (Cl. 204—1)

This invention relates to alkali analysis, and more particularly, to an improved galvanic process and apparatus for determining alkalies such as lime, ammonia or other basic species which yield hydroxyl ions in aqueous solutions.

It has been known in the art for several years that aluminum electrodes are highly polarizable both anodically and cathodically over a wide potential range and remain polarized both in the presence and absence of oxygen. At potentials more base than —0.5 volt vs. SCE (standard calomel electrode) currents are produced by electrode pairs including an aluminum electrode which are proportional to the concentration of hydroxyl and fluoride ions. This property of the aluminum electrode has been applied in amperometric titrations of fluoride or species reacting with fluoride, in acid-base potentiometric titrations in which case the aluminum electrode was used as a pH indicator electrode and, further, in amperometric titrations of acids with bases in which the current was drawn by the direct depolarization of the aluminum electrode by the alkaline titrant. A complete description of these methods have been reported in articles appearing in Analytica Chimica Acta, vol. 21, Nr. 1, July 1959 and Nr. 2, August 1959, by I. M. Kolthoff and C. J. Sambucetti. In each of the aforementioned methods, the respective equilibrium potentials or diffusion currents measured in the titrations are proportional to the concentration of hydroxyl ions. However, only a small portion of the alkali in the solution is consumed in the process and, consequently, a coulometric output is not provided. Furthermore, in the amperometric system it is necessary to apply an external electromotive force to the electrode pair to perform the titration.

It is the principal object of the present invention to provide a galvanic process and apparatus for determining basic species wherein the conversion of the species into current is determined solely by Faraday's law, thus providing a coulometric yield.

A further object of the invention is to provide a coulometric process and apparatus for determining basic species either on a continuous or batch basis.

A further object of the invention is to provide a method and apparatus for coulometrically determining basic species in which the apparatus does not require an external electromotive force.

Still a further object of the invention is to provide a process and apparatus for determining acid species indirectly by determining its effect on a basic species.

According to the principal aspect of the present invention, use is made of the known characteristic of aluminum electrodes that they are depolarized by basic species, by coupling an aluminum electrode with a cathode of active carbon or, in some cases Hg—$Hg_2SO_4$, in an aqueous electrolyte. When an alkali or another basic species is conveyed to the electrolyte, hydroxyl ions are formed which results in the electrochemical oxidation of the aluminum anode. The free energy of oxidation of the aluminum anode, coupled with the reduction of oxygenated surface compounds on the carbon, is converted into electrical energy. The current generated in the cell is a measure of the rate of entry of the basic species into the electrolyte and is related to this rate by Faraday's law. Thus by the invention there is provided a coulometric process and apparatus for determining basic species, which is not affected by the geometry of the cell or by temperature and, thus, there is no requirement for calibration or for the provision of a standard source of hydroxyl ions. Furthermore, there is no requirement for the application of an external electromotive force across the electrodes, thus providing a very inexpensive and simple apparatus for determining basic species.

2

According to another aspect of the invention, acid species are determined indirectly by producing a constant level of hydroxyl ions in the cell described above and by measuring the reduction in current generated by the cell upon the delivery of an acid species to the cell electrolyte which reduces the hydroxyl ion concentration of the electrolyte.

Figure 2:
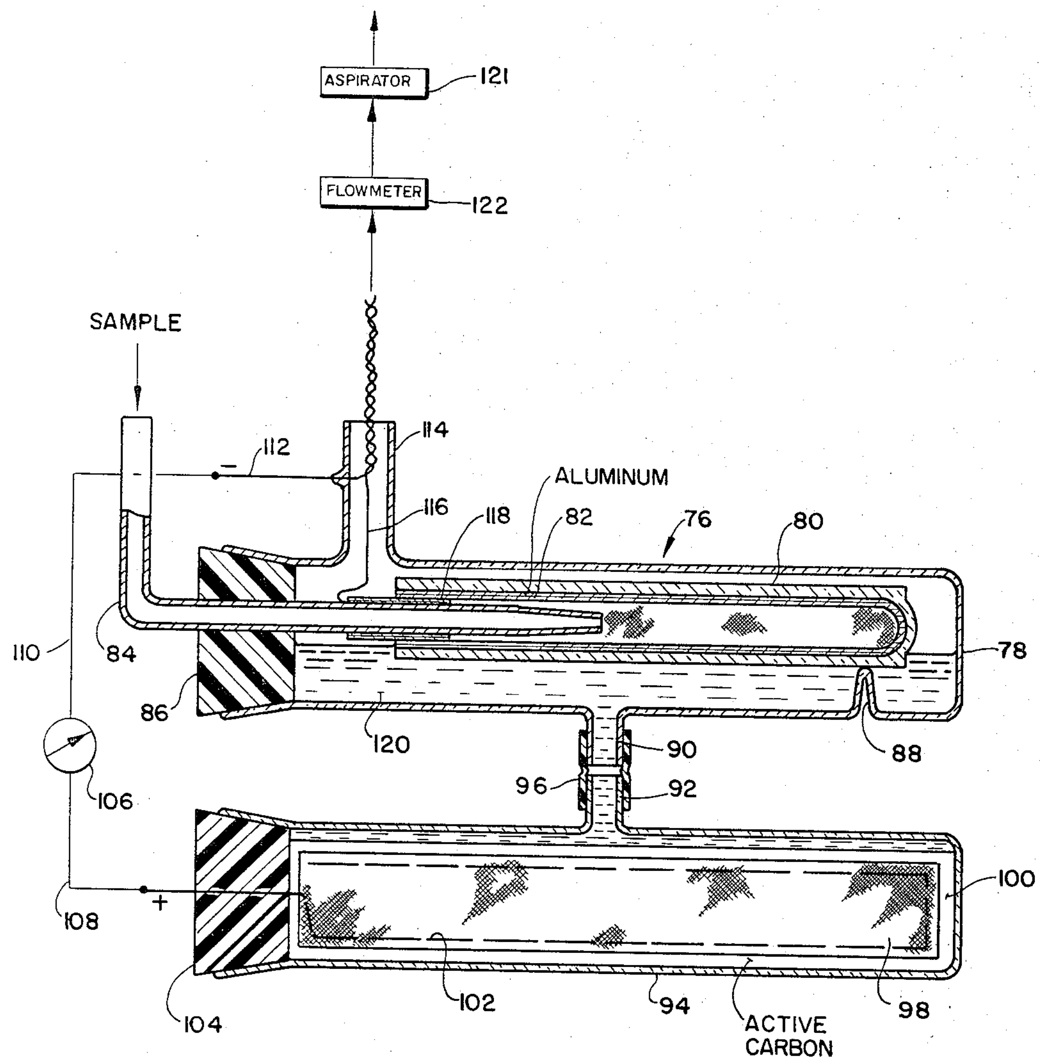

Other objects, aspects and advantages will become apparent from the following description taken in connection with the accompanying drawings wherein:

FIG. 1 is a sectional view of one embodiment of the galvanic cell of the invention for determining both acid and basic species; and FIG. 2 is a sectional view of another embodiment of the invention for determining the basic species in gaseous form only.

In the preferred embodiment of the invention, there is provided a galvanic cell in which there is disposed an aluminum anode and a cathode formed of active carbon with the electrodes joined by a neutral unbuffered electrolyte. Since the aluminum is highly polarized, in the absence of hydroxyl ions in the electrolyte, the current which flows through the cell is very small. However, upon the introduction of a basic species into the electrolyte, such as sodium hydroxide or ammonia gas, a galvanic current is generated dependent in magnitude upon the concentration of the basic species. The electrochemical reactions taking place in the galvanic cell are:

At the anode:

$$Al+4OH^-=H_2AlO_3^-+H_2O+3e \quad (1)$$

At the cathode:

$$\ldots C=O+H^++e= \ldots C—OH \quad (2)$$

or $$\ldots C=O+2H^++2e= \ldots C+H_2O \quad (3)$$

Thus, the aluminum is oxidized giving off electrons to the external circuit connecting the electrode pair. These electrons are used up at the carbon cathode where reduction of surface quinone-type groups takes place.

The over-all reaction occurring in the cell is:

$$Al+4OH^-+3 \ldots C=O+3H^+=H_2AlO_3 +H_2O+3 \ldots C—OH \quad (4)$$

The net effect of the over-all reaction in the cell is the production of current through the dissolution of aluminum by hydroxyl ions at the expense of oxygen-carbon complexes which are reduced at the carbon surface.

According to Equation 1, each equivalent of hydroxyl ion entering the cell per minute should, in order to provide a coulometric yield, generate a current of ¾ × 1608.1 microamperes. Thus, for example, 1 microgram of NaOH delivered to the cell should generate a current output of $$\frac{3}{4}\times\frac{1608.1}{40}$$

microamperes per minute. Consequently, a liquid stream continuously flowing through the cell and carrying A micrograms per minute of NaOH should produce a current pulse of $$i=A\frac{3}{4}\,\frac{1608.1}{40}\mu a. \quad (5)$$

The current generated by the cell is therefore, at constant alkali concentration, a function solely of the rate of entry of the basic species into the electrolyte. Consequently, the cell of the present invention may be utilized for making batch analyses of alkalies or basic species, the addition of a measured volume of the sample producing a current peak, the area under which represents the amount of the species added to the cell electrolyte.

The invention may also be utilized for monitoring gaseous basic species such as ammonia. In the analysis of ammonia gas, the basis of the response of the cell to ammonia is the fact that upon reaching the cell the ammonia dissociates in the electrolyte according to the equation:

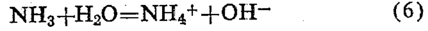

$$NH_3+H_2O=NH_4^++OH^- \quad (6)$$

and the hydroxyl ion thus formed reacts with the aluminum in the same manner as shown in Equation 1 above.

Hence, in the monitoring of a gaseous species such as ammonia, a gas stream of 100 milliliters per minute containing 1 volume per million of $NH_3$ represents a supply of $$\frac{10^{-7}}{24.05}$$

equivalents of $NH_3$ per minute. Assuming that each equivalent of $NH_3$ produces one equivalent of $OH^-$ and that the latter reacts as in Equation 1 above, each volume per million of $NH_3$ at the said flow rate should develop per minute a current of $$\frac{10^{-7}}{24.05}\times\frac{3}{4}\times 1608.1$$

microamperes. Hence, a stream passing through the cell at a rate of F milliliters per minute, with a concentration of X volumes of $NH_3$ per million should develop a galvanic current given by the equation:

$$i_{(NH_3)}=0.0502FX\ \mu a. \quad (7)$$

Thus, by merely noting the rate of flow of gas through the cell and measuring the current flowing in the circuit of the cell, a direct measurement of the concentration of the hydroxyl ions in the electrolyte and, therefore, of the basic species in the sample gas stream, is provided.

As will be seen later, a coulometric yield in accordance with Equations 5 and 7 above is obtained by the present invention in performing batch analyses of basic species and in monitoring gaseous basic species as described above.

The electrolyte utilized in the cell of the invention must be neutral and unbuffered. An example of suitable electrolytes is 2 molar $Na_2SO_4$ or $NaNO_3$. Solutions made from potassium salts, if neutral and unbuffered, may also be utilized. It is merely important that the electrolyte be neutral and not adversely affect the reaction of the hydroxyl ions with the aluminum anode as it would if the electrolyte were buffered.

Although it is preferred that the cathode of the cell be formed of active carbon, it is also possible to provide a coulometric cell in which no external EMF is applied thereto when a mercury-mercurous sulfate cathode is used. However, when utilizing the latter, a relatively high cell background current is generated and, therefore, the active carbon cathode is preferred. It is essential that the carbon cathode be active, that is it must participate in the electrochemical reactions occurring in the cell and not merely conduct electrically. Hence, the cathode should have a large, reactive surface and the carbon particles, when forming a bed without compression, should have enough contact with each other to ensure conductive continuity throughout the bed. The cathode is preferably formed by making a thick paste from active carbon, such as Darco G–60, and the cell electrolyte and electrical connection to the current measuring means associated with the cell is provided generally by embedding a platinum screen in the paste and connecting a platinum wire to the screen for connection to the current measuring device.

Referring now to the drawings, there is illustrated in FIG. 1 the preferred embodiment of the cell of the present invention. The cell comprises a glass cell or receptacle 10 having an elongated upright anode section or compartment 11. The anode section has its lower end 12 connected through a plastic sleeve 14 to a glass fitting 16 having two legs 18 and 20. A stop cock 22 controls flow from the end of the leg 18 whereas leg 20 of the fitting 16 is connected to a second fitting 24 by a rubber sleeve 25. The anode section 26 of the cell is connected to the lower portion of fitting 24 by a sleeve 28 whereas the upper portion of the fitting 24 is closed by a rubber cap 30. The anode compartment 26 carries a platinum wire 32 which is fused in the wall of the compartment. The wire 32 is woven into a platinum screen 34 which is embedded in a body of active carbon paste 35, described previously. A cotton plug 36 in the upper portion of the compartment 26 prevents the anode material from being disturbed by the circulation of electrolyte in the remainder of the cell. As indicated previously, however, the anode compartment may contain mercury-mercurous sulfate rather than active carbon, but with the former a relatively high background current is generated by the cell.

The anode compartment 11 of the cell is connected at its upper and lower ends respectively to an upright gas lift or bubble chain tube 38. A capillary tube 40 is connected to the gas lift tube adjacent its lower end for introducing a stream of gas into the cell. The apparatus immediately above the junction of the gas lift tube 38 and anode compartment 11 is provided with a gas-liquid separation compartment 42. The upper end of the separation chamber 42 is coupled to a flowmeter 44 and an aspirator 46, shown schematically in FIG. 1.

The anode compartment 11 houses the anode of aluminum 48 which should be pure aluminum preferably in reticulated form such as a screen or the like. Suitable anodes have been formed from 99.99% pure aluminum wire in which a bundle of 1 millimeter diameter wires is fitted tightly in the anode compartment 11. However, it is possible to increase the surface area of the aluminum and, therefore, increase the speed of response of the cell by winding 0.25 millimeter diameter aluminum wire as three coaxial helixes, partially distending the triple helix, then bending it over several times and finally twisting the final material into a compact bundle. A platinum wire 50 is attached at one end to the aluminum electrode 48 and at its other end to a conductor 52 connected to one terminal of a current measuring device 54. The other terminal of the current measuring device 54 is connected through conductor 56 to the platinum wire 32 leading into the cathode compartment 26. The cell is sufficiently filled with electrolyte 58 so that the anode is completely submerged therein.

In the operation of this apparatus, a gas stream containing a basic species such as ammonia is introduced into the capillary tube 40 and enters the lower portion of the gas lift tube 38 in the form of a jet, breaking up to give a chain of gas bubbles in the tube. The bubbles are separated by short slugs of liquid as seen in FIG. 1. During the upward movement of the chain, the bubble-solution interface renews itself continually and turbulently ensuring an efficient dissolution of the ammonia in the electrolyte providing it with hydroxyl ions. The tube 38 should be of sufficient length so that when the bubbles reach the top of the tube all the ammonia has dissolved therein and converted into hydroxyl ions. The gas stream having carried the ammonia into the cell separates from the electrolyte in the separation chamber 42 and is exhausted from the cell by means of the aspirator 46. The upward movement of the chain of gas bubbles in the tube 38 causes a circulation of the electrolyte in the cell between the tube 38 and the cathode compartment 11 in a counterclockwise direction as seen in FIG. 1. Consequently, the electrolyte containing hydroxyl ions formed from the ammonia passes over the aluminum anode 48 whereby the total amount of hydroxyl ions is consumed at the anode during the oxidation of the aluminum. Thereafter, the electrolyte returns to the bubble chain 38 and continues the cycle. As discussed previously, the current generated by the cell in this process provides a measure of the concentration of the ammonia in the sample gas. When the cell is utilized for batch analyses of basic species in solution, the batch sample is added to the cell directly in chamber 42 while a stream of gas, either air or an inert gas such as nitrogen, is bubbled through the cell by the capillary tube 40 to effect a mix and circulate the sample through the anode 48. The current pulse generated by the cell as a result of the introduction of the batch sample thereto may be integrated to provide an indication of the amount of the basic species in the sample.

When the cell of FIG. 1 is utilized for determining ammonia, the cell response deteriorates with time in yield and speed because of the accumulation of ammonium ions in the electrolyte which hinders further dissociation of the ammonia molecules therein. Consequently, the coulometric characteristics of the cell depreciate with the build-up of ammonium ions in the electrolyte. Consequently, it is advisable to continuously renew the electrolyte 58 in the cell by adding fresh electrolyte to the upper portion of the cell 42 by a gravity feed device or the like (not shown) and draining the excess electrolyte from the bottom of the cell through the stop cock 22. The cell in FIG. 1 has provided coulometric results with concentrations of ammonia up to 200 parts per million and the coulometric results have been extended for a period of time of about 6 hours when a continuous flow of 0.25 milliliter per minute of electrolyte has been added to the cell and excess electrolyte at the same rate withdrawn therefrom from the bottom of the cell. The cell has also been found to be responsive to methylamine, ethylamine, and other basic species.

The invention also permits the determination of acid species indirectly by producing a constant level of hydroxyl ions in the cell, thus establishing a constant current output, and then by adding the acid species to the cell to reduce the hydroxyl ion content and therefore depress the current output of the cell. The change in current output is then compared to the change produced by a known amount of the acid species in order to calculate the concentration of said acid species in the gas. In this determination of acids in terms of alkali consumed, with the residue of alkali determined by means of an aluminum electrode in accordance with the present invention, it is possible, though not mandatory, to employ a principle disclosed in copending patent application entitled, "Gas Analysis," by Paul A. Hersch and Rudolf Deuringer, Ser. No. 433,554, filed concurrently herewith and assigned to the assignee of the present application. Said application discloses the feasibility of coulometrically generating a reagent in an electrolytic system with an applied external electromotive force, reacting the reagent with a species to be analyzed, and arranging for the excess reagent to actuate a second galvanic system without applied electromotive force for measuring the reagent left over in an electrolyte common to both systems. Applying this principle to the present invention, the reagent generated is the hydroxyl ion, while the species to be analyzed is the hydrogen ion, from acid.

To this end, a stem 60 depending from the lower portion of the gas lift tube 38 has positioned therein a platinum wire 62 which extends through a rubber cap 64 closing the end of the stem 60. The wire 62 is connected to a platinum screen 65. A conductor 66 connected to the platinum wire 62 connects in series a power source 68, a variable resistor 70 and a current measuring device 72 with the other end of the conductor connected to the platinum wire 32 of the cathode. The platinum screen 65 provides the generating electrode, namely the cathode, of a coulometric generating system wherein the active carbon 35 becomes a common electrode for the two cells, namely the cathode of the galvanic measuring cell and the anode of the coulometric generating cell. As well known in the art, the platinum cathode of the coulometric generating cell generates an amount of hydroxyl ions in the electrolyte depending upon the current impressed between the electrodes 35 and 65. Consequently, when a current is introduced externally between the carbon electrode 35 and platinum screen 65, Faraday's law establishes that the relation should be for the galvanic cell output (J):

$$J = \tfrac{3}{4} I \qquad (8)$$

where I represents the current input between the two electrodes of the coulometric generator.

Consequently, when it is desired to determine an acid species, a current is impressed across the electrodes 35 and 65 to internally generate hydroxyl ions which will result in a constant output of the galvanic cell comprising the electrodes 48 and 35. Hence, when an acid species such as $CO_2$ is delivered to the cell through the duct 40, the reduction in the hydroxyl ions in the cell results in a decrement current in the galvanic cell which is a function of the acid concentration in the sample gas. Concentrations of the order of 0.03% of $CO_2$ have been found to produce a current decrement of the order of 400 microamperes, which is less than predicted by theory, but is a significant effect which allows the measurement of $CO_2$ in gases by comparing the observed current decrement with that of known $CO_2$ samples.

The coulometric generator in the cell of FIG. 1 also provides a convenient means for calibrating the cell, if any calibration is required, and also provides a means for establishing the coulometric output of the galvanic cell system. The results of a series of tests in which different levels of hydroxyl ions are provided in the cell electrolyte by the coulometric generating electrodes and the current output of the galvanic cell is determined and compared with the theoretical calculated output appearing in Table I below:

TABLE I

| Test Series No. | OH- Generating Current | Galvanic cell current | | | Calculated Output | Yield |
|---|---|---|---|---|---|---|
| | | Background | Total | Difference | | |
| | I, μa. | $i_0$, μa. | i, μa. | $i-i_0$, μa. | J-¾ I, μa. | $i-i_0/J$ |
| 1 | 1,000 | 45 | 790 | 745 | 750 | 0.99 |
| | 500 | 45 | 395 | 350 | 375 | 0.93 |
| 2 | 500 | 25 | 385 | 360 | 375 | 0.96 |
| | 1,000 | 30 | 770 | 740 | 750 | 0.98 |
| 3 | 500 | 140 | 495 | 355 | 375 | 0.94 |
| | 1,000 | 140 | 880 | 740 | 750 | 0.98 |
| 4 | 500 | 95 | 445 | 350 | 375 | 0.93 |
| | 1,000 | 80 | 830 | 750 | 750 | 1.00 |
| | 2,000 | 100 | 1,620 | 1,520 | 1,500 | 1.01 |
| | 1,000 | 90 | 850 | 760 | 750 | 1.01 |
| 5 | 1,000 | 50 | 800 | 750 | 750 | 1.00 |
| | 500 | 45 | 420 | 375 | 375 | 1.00 |
| | 2,000 | 80 | 1,620 | 1,540 | 1,500 | 1.02 |
| | 1,000 | 60 | 790 | 730 | 750 | 0.97 |

In test series 1 and 3 in Table I, 2 molar sodium nitrate solutions were used as the electrolyte whereas 2 molar sodium sulfate solutions were used in test series numbers 2, 4 and 5. In test series 1, 2 and 3 in Table I, 100 milliliters of nitrogen per minute were passed through the cell whereas in test series 3 and 5, 100 milliliters of air per minute were passed through the cell. As seen from the column headed "Yield" in Table I, the galvanic cell of the invention yields current increments very close to those expected from Faraday's law. When utilizing the cell for performing batch analyses of basic species, for example 0.01 normal sodium hydroxide and ammonium hydroxide, practically complete theoreotical response was ob tained in titrations of 0.1 milliliter of the basic solutions, as was proved after integration of the corresponding peak currents. Therefore, it is seen by the invention that there is provided a very simple and inexpensive cell for coulometrically determining basic species, either on a batch or continuous basis, which does not require an external electromotive force, and also may be utilized for determining acid species by use of a coulometric generator for providing hydroxyl ions. It is to be understood in the latter method, that the hydroxyl ions could also be supplied to the cell by utilizing a separate pair of coulometric generating electrodes in addition to the aluminum and active carbon electrodes of the galvanic cell rather than using the active carbon electrode as a common electrode. Furthermore, hydroxyl ions could be provided by delivering a suitable reagent at a constant flow rate to the cell rather than by internal generation of the hydroxyl ions in the cell.

Another embodiment of the invention is illustrated in FIG. 2 in which there is shown a galvanic cell arrangement which is suitable for detecting certain basic gaseous species such as ammonia, amines or other gaseous species, which, when dissolved in an aqueous electrolyte, produce hydroxyl ions. The cell 76 in FIG. 2 comprises an outer compartment 78 which receives an inner compartment or anode section 80 formed of porous glass, porous ceramic or any other porous material exposing to the interior of the compartment an inert surface. The inner walls of the compartment 80 are clad with an aluminum anode 82 which may comprise an aluminum element made by closely winding one millimeter diameter aluminum wire into many turns forming a hollow electrode closed at one end. Preferably the anode 82 comprises a pair of hollow porous aluminum members separated by filter paper or the like (not shown) for causing the members to be wetted by a film of electrolyte as will appear later. A glass capillary tube 84 is secured to the outer compartment 78 of the cell by being frictionally fitted in a plastic stopper 86 closing the open end of the outer compartment. The tube 84 provides support for the open end of the compartment 80 while the closed end of the compartment is supported by a protruding portion 88 of the outer compartment 78. By this arrangement, the outer walls of the porous compartment 80 are spaced from the inner walls of the outer compartment 78.

Compartment 78 has a downwardly extending stem 90 which communicates with a stem 92 of a cathode section or compartment 94, the stems being secured together by a plastic sleeve 96. The cathode compartment 94 receives a piece of graphite cloth 98 buried in a sludge of active carbon 100 which fills the major portion of the compartment. A platinum wire 102 is woven through the cloth 98 and extends through a plastic stopper 104 closing the open end of the compartment 94. The wire is connected to a current measuring device 106 by a conductor 108. The device 106 also is connected by conductor 110 to a platinum wire 112 which is fused into a stem 114 on the outer compartment 78. The end of the wire 112 in the stem 114 is wound about a second platinum wire 116 which is connected to a multiple layer aluminum screen 118 disposed between the tube 84 and the anode 82. An electrolyte 120, of the same composition as the electrolyte 58 described in connection with the embodiments shown in FIG. 1, is provided in the outer compartment 78 of the cell in sufficient quantity to be partially in contact with the porous anode compartment 80 in which it will be absorbed, and to completely fill the cathode compartment 94. As in the embodiment of the invention illustrated in FIG. 1, the cathode 100 may also be formed of mercury-mercurous sulfate.

An aspirator 121 is provided to draw the sample gas into the inner chamber 80 via the capillary tube 84 where the basic species in the gas will dissolve in the film of electrolyte provided on the surface or in the interstices of the aluminum anode 82. The gas is then drawn from the cathode compartment 80 through the multilayer screen 118 at the open end of the compartment 80 and through the stem 114 to the flowmeter 122. In this arrangement, in contrast to that shown in FIG. 1, the gas sample passes directly to the anode without the basic species dissolving in a body of electrolyte prior to reaching the anode. Consequently, in this embodiment of the invention, the response to the basic species in the sample gas is very fast, on the order of a few seconds to reach 100% of the signal produced by the cell. However, the aluminum anode tends to passivate in air rather quickly and requires frequent reactivation.

It is to be understood that after use of the cells of the present invention, an oxide film forms a dark layer on the aluminum surface of the anode thus resulting in the electrode becoming completely passivated. This may be overcome by merely immersing the aluminum for about ten minutes in 5% Versene solution whereby the dark film disappears quickly leaving a bright, clean aluminum surface.

Although several embodiments of the invention have been disclosed herein for purposes of illustration, it will be understood that various changes can be made in the form, details and arrangements and proportions of the various parts in such embodiments without departing from the spirit and scope of the invention as defined by the appended claims.

What is claimed is:

1. In a galvanic process for determining a basic species, the steps comprising:
conveying a gas stream containing said species to an aqueous electrolyte contacted by an aluminum anode and a cathode selected from the group consisting of active carbon and Hg—$Hg_2SO_4$, whereby the aluminum anode is oxidized by the hydroxyl ions resulting from the dissolution of said species in said electrolyte; and
measuring the current across the anode and cathode as a function of the rate of entry of said species into the electrolyte.

2. A process as set forth in claim 1 wherein said electrolyte is a neutral unbuffered solution.

3. In a galvanic process for determining a basic species, the steps comprising:
conveying a gas stream containing said species to an aqueous electrolyte and dissolving the species therein to produce hydroxyl ions;
directing the electrolyte to an aluminum anode to oxidize the anode while maintaining the electrolyte in contact with an active carbon cathode; and
measuring the current across the anode and cathode as a function of the rate of entry of said species into the electrolyte.

4. A process as set forth in claim 3 including the step of separating the gas stream from the electrolyte prior to directing the electrolyte containing the dissolved species to said aluminum anode.

5. In a galvanic process for determining a basic species, the steps comprising:
providing a cell containing an aluminum anode and an active carbon cathode joined by an aqueous electrolyte with said anode having only a film of said electrolyte thereon;
conveying a gas stream containing said species directly to said aluminum anode whereby the species dissolves only in the electrolyte film on the anode and the anode is oxidized by the hydroxyl ions resulting from the dissolution of the species in the film; and
measuring the current across the anode and cathode as a function of the rate of entry of said species into the electrolyte.

6. In a galvanic process for determining a basic species, the steps comprising:
conveying a gas stream containing said species into a zone in a body of aqueous electrolyte so as to create a liquid stream in said body and to cause the species to dissolve in the electrolyte to produce hydroxyl ions;
separating the gas stream from said liquid stream after the species is dissolved therein;
directing the liquid stream after separation from the gas stream over an aluminum anode so as to oxidize the anode, while maintaining said electrolyte in contact with an active carbon cathode;

directing the liquid stream from the anode back to said zone so as to complete a circular motion of the electrolyte; and measuring the current across the anode and cathode as a function of the rate of entry of said species in the electrolyte.

7. In a galvanic process for batch analysis of a basic species, the steps comprising:

dissolving said species in an aqueous electrolyte to produce hydroxyl ions;

directing said electrolyte containing hydroxyl ions to an aluminum anode to oxidize the anode, while maintaining the electrolyte in contact with a cathode selected from the group consisting of active carbon and Hg—$Hg_2SO_4$; and integrating the current signal developed across the anode and cathode resulting from the process as a measure of the amount of the basic species.

8. In a galvanic process for determining an acid species, the steps comprise:

providing a cell containing an aluminum anode and a cathode selected from the group consisting of active carbon and Hg—$Hg_2SO_4$, with said anode and cathode being joined by an aqueous electrolyte;

producing a constant level of hydroxyl ions in said electrolyte whereby said cell generates a constant current output by oxidation of said anode in the absence of a change in the acid species content of the electrolyte;

conveying a gas stream containing said acid species to said electrolyte whereby said level of hydroxyl ions is reduced in the electrolyte and, thereby, the current output of the cell is reduced; and measuring the reduction in current output of the cell as a function of the rate of entry of said acid species into the electrolyte.

9. A process as set forth in claim 8 wherein said constant level of hydroxyl ions is produced by coulometric generation of said ions directly in said electrolyte.

10. A galvanic cell for determining a basic species comprising:

a cell adapted to hold a body of liquid;

an aluminum anode disposed within said cell;

a cathode selected from the group consisting of active carbon and Hg—$Hg_2SO_4$ spaced from said anode within the cell; and means for connecting a current measuring means to said anode and said cathode for measuring the current generated therebetween.

11. A galvanic cell for determining a basic species in a gas stream comprising:

a cell adapted to hold a body of liquid, said cell having a portion forming a substantially continuous, closed loop allowing circulation of the liquid;

said loop having, in series, means for introducing said gas stream into said loop, a section of sufficient length to permit dissolution of said species in the liquid and an aluminum anode;

a cathode of active carbon within said cell; and means for connecting a current measuring means to said anode and said cathode for measuring the current generated therebetween.

12. A galvanic cell as set forth in claim 11 including means in said loop means between said gas introducing mean and said anode for separating the gas stream from the liquid in the cell.

13. A galvanic cell as set forth in claim 11 wherein said cathode is outside of said loop but connected thereto between said anode and said gas introducing means.

14. A galvanic cell for determining a basic species in a gas stream comprising:

a cell adapted to hold a body of liquid, said cell having an elongated upright anode section and a cathode section in communication with said anode section and spaced therebelow;

an upright gas lift tube connected at its upper and lower ends to respective upper an lower portions of said upright anode section;

a vent means at the upper portion of said cell for permitting the escape of the gas stream from said cell;

means for introducing the gas stream into a lower section of said gas lift tube, thereby bringing about a circulation of the liquid upwardly within the gas lift tube past said vent means to said upper portion of said upright anode section, downwardly through said anode section and back to the lower end of said gas lift tube;

an aluminum anode in said anode section of the cell;

an active carbon cathode in the cathode section of the cell; and means for connecting a current measuring means to said anode and said cathode for measuring the current generated therebetween.

15. An apparatus for determining an acids species in a gas stream comprising:

a cell adapted to hold a body of liquid, said cell having a portion forming a substantially continuous, closed loop allowing circulation of the liquid;

said loop having, in series, means for introducing said gas stream into said loop, a section of sufficient length to permit dissolution of said species in the liquid, and an aluminum anode;

a cathode of active carbon within said cell;

means in said cell for coulometrically generating a basic species in the liquid; and means for connecting a current measuring means to said anode and said cathode for measuring the current generated therebetween.

16. A galvanic cell as set forth in claim 15 wherein said coulometric generating means includes a pair of electrodes, one of said electrodes being said active carbon.

17. A galvanic cell for determining a basic species in a gas stream comprising:

a cell, a porous member dividing said cell into two compartments, one of said compartments being adapted to hold a liquid;

a cathode selected from the group consisting of active carbon and Hg—$Hg_2SO_4$ in said one of said compartments;

an aluminum anode disposed in the other of said compartments in contact with said porous member;

means for introducing said gas stream into said other of said compartments; and means for connecting a current measuring means to said anode and said cathode for measuring the current generated therebetween.

References Cited

UNITED STATES PATENTS

| | | | |
|---|---|---|---|
| 2,870,067 | 1/1959 | Baker et al. | 204—1 |
| 3,058,901 | 10/1962 | Farrah | 204—1 |
| 3,234,117 | 2/1966 | Rost et al. | 204—195 |
| 3,236,759 | 2/1966 | Robinson | 204—195 |
| 3,258,411 | 6/1966 | Hersch | 204—1 |
| 3,314,864 | 4/1967 | Hersch | 204—1 |

OTHER REFERENCES

Kolthoff et al.: Analytica Chimica Acta," vol. 21, No. 1, pp. 17–24.

Kolthoff et al.: Analytica Chimica Acta," vol. 21, No. 2, pp. 155–165.

HOWARD S. WILLIAMS, *Primary Examiner.*

JOHN H. MACK, *Examiner.*

T. TUNG, *Assistant Examiner.*